Jan. 17, 1928.

E. G. OAKLEY 1,656,222

SUPPLY PIPE

Filed Oct. 1, 1921

Inventor
Erastus G. Oakley
By Henry E. Rockwell
Attorney

Patented Jan. 17, 1928.

1,656,222

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

SUPPLY PIPE.

Application filed October 1, 1921. Serial No. 504,792.

My invention relates to supply pipes and more particularly to the construction and formation of a pipe having a flanged end which is adapted to be received in a coupling or the like for connection with another joint of pipe to form a continuous line. It is common practice to form an exterior annular shoulder upon or adjacent to the end of the pipe which is passed through the opening of the coupling, the latter having a complemental interior shoulder which abuts against the exterior shoulder formed on the pipe, thus holding the end of the pipe within the coupling.

Heretofore this exterior flange has been provided upon the pipe by the provision of a member having a lateral flange of suitable width and a threaded stem which is screwed into the end of the pipe, the flange projecting beyond the periphery of the pipe to the desired extent. This flange member is then soldered into the pipe to insure a tight connection. Such a procedure obviously necessitates the threading of the interior of the pipe adjacent the end thereof, the manufacture of the stemmed flange member externally threaded, and finally the screwing of the latter member into the pipe and soldering the joint between them. This is naturally a somewhat expensive operation from the standpoint of materials used and of labor or time involved.

My invention has for its object the construction of a supply pipe provided with a flanged end at a substantial saving, both in labor and materials involved.

Another object of my invention is to provide a pipe of the general character described, which shall have integrally formed external and internal flanges, the internal flange serving to lessen the effective area of the cross-section of the pipe.

A still further object of my invention is to provide a pipe formed of material of standard thickness with an integrally formed end flange of material thinner than that of the wall of the body of the pipe.

Also my invention relates to a method of manufacturing pipes of this character, wherein the wall of the pipe adjacent the end thereof is reduced in thickness and is then upset inwardly and outwardly to form inner and outer flanges integral with the material of the pipe, but formed of material thinner than the wall thereof.

To these and other ends the invention consists in the novel features and combination of parts to be hereinafter described and claimed.

In the accompanying drawings.

Figure 1:
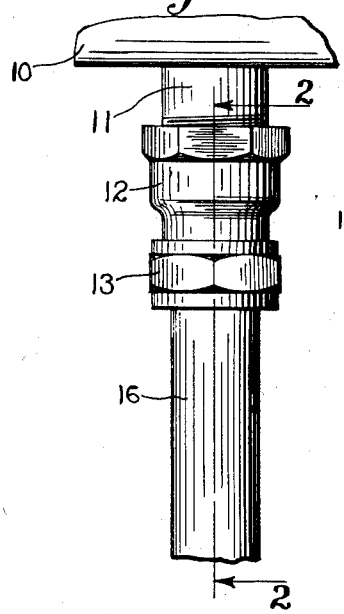
Fig. 1 is an elevational view of a pipe embodying the principles of my invention illustrated in connection with certain coupling members with which it may be used.
Figure 2:
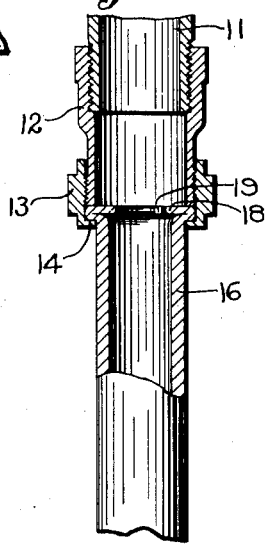
Fig. 2 is a sectional view on line 2—2 of Fig. 1.

While it will be obvious that my invention is capable of many other specific applications, I have shown, as a preferred embodiment thereof, a supply pipe of improved construction for a lavatory tank. The tank is shown at 10, provided with the nipple 11, upon which may be threaded a reducer 12. The particular connections used are of course of no importance except in connection with the illustration of a preferred form of my invention.

It is usual to connect a length of pipe to the reducer 12 by means of a threaded coupling 13 having an interior flanged collar 14 which abuts against an outwardly formed flange 15 upon the pipe 16, thus drawing the lower end of the reducer 12 closely upon the flange 15 and forming a water tight joint. In order to provide a pipe suitable for such a connection, it is of course necessary to form upon one end thereof the exterior flange 15, and it is usually also dessirable, in some manner to reduce the interior diameter of the pipe to some extent in order to reduce to some extent the flow of water therethrough.

The most approved practice in manufacture of pipes of this character embodies the use of pipe stock of dimensions known as the standard iron pipe size, wherein the wall of the pipe is of considerable thickness, thus rendering the interior diameter considerably smaller than the exterior diameter of the pipe. For example, the pipe known as the ⅜" iron pipe size usually has an exterior diameter of about .675" and an interior diameter of .494". It has been found that when an attempt has been made to upset or flange over the walls of such pipes to form the desired end flange, the metal has a tendency to split, thus damaging the pipe to a degree which prevents its use. The particular dimensions above given are of course merely for the purpose of illustration, as the principle holds for all sizes of pipes of this general character.

I have discovered, however, that if the wall of a pipe is thinned adjacent the end thereof, this thinner portion of the wall may then be upset or flanged over to provide an exterior flange and then doubled upon itself to extend beyond the inner periphery of the pipe and provide an internal flange, thus reducing the effective interior diameter of the pipe to the desired extent. The metal is caused to flow to some extent during the operation so that smooth internal and external flanges are formed without any buckling or crimping of the metal except in the desired directions.

Figure 3:
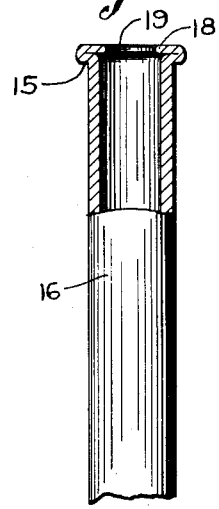
Fig. 3 is a sectional view similar to Fig. 2, but showing the pipe isolated from the connections used therewith.
Figure 4:
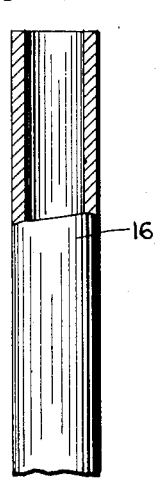
Fig. 4 shows a length of stock pipe as it appears prior to the beginning of the flange forming operations.
Figure 5:
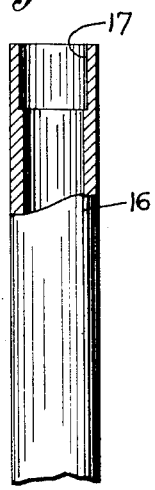
Fig. 5 is a view similar to Fig. 4, but showing the length of pipe after the reduction in thickness of the wall near the end thereof.

To this end the wall of a pipe of usual dimensions is reduced in thickness adjacent the end of the pipe by any suitable method, such as boring or reaming out the interior of the pipe for a short distance from the end thereof, as shown at 17 in Fig. 5. The pipe is then placed in a suitable stamping machine or die, and the thinner end portion is turned over, as shown in Fig. 3, the lower portion of the thin walled length of the pipe being turned outwardly to provide the external flange 15 and then folded over upon itself inwardly to project beyond the interior wall of the pipe and provide an interior flange 18 presenting a reduced supply opening 19. The folded over portion of the pipe which provides the flange 18 presents a flat top surface upon which the reducer 12 may be closely drawn by the coupling 13 to form a water tight joint.

It will be obvious that in this manner, interior and exterior flanges are formed integrally with the wall of the pipe, but of thinner material than the body of the latter, and the pipe may be produced in a finished form with much less expense than has been possible heretofore where a separate flange member was manufactured and thereafter attached to the end of the pipe.

While these pipes are made of varying thicknesses and dimensions, according to the use for which they are intended, it will always be possible, within wide limits, regardless of the dimensions of the pipe to form an end flange by my improved method when the wall of the pipe is first reduced in thickness, as shown. Also by varying the length of that part of the pipe which is bored out as shown at 17 in Fig. 5, it will of course be possible to vary the width of the internal and external flanges formed. It is also possible of course to form the external flange, if desired, without providing an internal flange to reduce the diameter of the pipe.

While I do not wish to limit myself to any exact dimensions, it may be stated, by way of illustration, that given a pipe of the dimensions stated above, of which the exterior diameter was .675" and the interior diameter .494", it has been found that if the wall is thinned to provide an interior diameter of approximately .574", the wall may then be flanged over as described without any tendency of the material to split during the operation. A change in the material of which the pipe is made, however, may have some effect upon the thickness required of the flanged portion, but this can readily be determined for the kind of pipe to be used.

While I have shown and described a preferred form of my invention and a preferred method of manufacturing the same, it will be understood that changes may be made in many details without departing from the scope of the invention as defined by the appended claims.

What I claim is:

1. The method of making supply pipes, which consists in boring out the end of a pipe of standard iron pipe size and dimensions to reduce the thickness of the wall at one end thereof, and then doubling said thinned wall upon itself to form a two-ply external flange thereon transverse to the pipe axis, and an internal flange projecting beyond the interior surface of the pipe to reduce the size of the bore at the end thereof.

2. The method of making supply pipes, which consists in boring out the end of a pipe of standard iron pipe size and dimensions to reduce the thickness of the wall thereof, and then doubling said thinned wall upon itself while cold, to form exterior and interior flanges, the exterior flange being of two-ply thickness of the material of the thinned portion of the pipe.

3. The method of making supply pipes, which consists in boring out the end of a pipe of standard iron pipe size and dimensions to reduce the thickness of the wall thereof, and then doubling said thinned wall upon itself while cold, to form exterior and interior flanges, the exterior flange being of two-ply thickness of the material of the thinned portion of the pipe and pressing closely together the layers thereof to form a smooth flange transverse to the pipe axis.

4. The method of making an end flange on a tube which consists in uniformly thinning the wall of the tube adjacent one end thereof by enlarging the bore therein, and then offsetting a portion of the thin wall upon itself to form an exterior annular shoulder transverse to the tube axis, and an internal flange projecting beyond the interior surface of the tube to reduce the size of the bore at the end thereof.

5. The method of making an end flange on a tube which consists in first thinning the wall of the tube adjacent the end thereof, and then flanging over the thin wall to form interior and exterior flanges, the exterior flange being of two-ply thickness of material of substantially uniform thickness and thinner than the tube wall.

6. The method of making a flanged tubular member which consists in thinning the wall of the tube adjacent the end thereof, then doubling one portion of the thinned wall over upon another portion to form a laterally extending flange transverse to the axis of the tube, said flange being of two layers of material of substantially uniform thickness and thinner than the tube wall.

7. The method of making supply pipes or the like, which consists in boring out the end of a pipe to reduce the thickness of the wall and then displacing said thinned wall outwardly to form an external flange transverse to the axis of the pipe.

8. The method of making supply pipes, which consists in boring out the end of a pipe to reduce the thickness of the wall thereof and then doubling said thinned wall upon itself to form a two-ply external flange transverse to the pipe axis.

9. The method of making supply pipes which consists in first thinning the wall of the pipe adjacent the end thereof and then flanging over the thin wall to form an interior shoulder to reduce the effective diameter of the pipe and to form a flat end face transverse to the pipe axis.

10. The method of making flanged supply pipes which consists in boring out the end of a pipe to reduce the thickness of the wall, then flanging said thinned wall outwardly and doubling it inwardly upon itself to provide interior and exterior flanges or shoulders for the purpose described.

11. The method of making a flanged supply pipe, which consists in boring out the end of a tubular blank to reduce the thickness of the wall, then turning this wall of reduced thickness outwardly to provide an outwardly projecting annular flange, then doubling the wall back closely upon itself to provide an annular inwardly projecting flange extending beyond the inner wall of the pipe and causing the metal to flow during said operations to produce upon the pipe end a flat surface transverse to the axis of the pipe and having an opening smaller in diameter than the interior diameter of the pipe.

In witness whereof, I have hereunto set my hand on the 28 day of September, 1921.

ERASTUS G. OAKLEY.